(12) United States Patent
Chandran et al.

(10) Patent No.: US 7,092,397 B1
(45) Date of Patent: Aug. 15, 2006

(54) METHOD AND APPARATUS FOR MAPPING AN MPLS TAG TO A DATA PACKET IN A HEADEND

(75) Inventors: Kartik Chandran, Mountain View, CA (US); Chrisanto Leano, San Jose, CA (US); Sunil Khaunte, Santa Clara, CA (US); Jerry D. Goodrich, York, ME (US); Kelly Schaefer, Leesburg, VA (US)

(73) Assignee: Cisco Technology, Inc., San Jose, CA (US)

( * ) Notice: Subject to any disclaimer, the term of this patent is extended or adjusted under 35 U.S.C. 154(b) by 1096 days.

(21) Appl. No.: 09/945,298

(22) Filed: Aug. 31, 2001

(51) Int. Cl.
*H04L 12/28* (2006.01)
*H04L 12/56* (2006.01)
*H04J 3/12* (2006.01)
*H04N 7/173* (2006.01)

(52) U.S. Cl. .................. 370/395.5; 370/522; 725/111; 709/228

(58) Field of Classification Search ............. 370/395.5, 370/465–467, 522; 725/111; 709/228, 221–222
See application file for complete search history.

(56) References Cited

U.S. PATENT DOCUMENTS

| 6,167,457 | A | 12/2000 | Eidson et al. | 709/328 |
|---|---|---|---|---|
| 6,208,975 | B1 | 3/2001 | Bull et al. | 705/14 |
| 6,324,621 | B1 | 11/2001 | Singh et al. | 711/129 |
| 6,330,610 | B1 | 12/2001 | Docter et al. | 709/229 |
| 6,693,878 | B1 * | 2/2004 | Daruwalla et al. | 370/235 |

* cited by examiner

*Primary Examiner*—Chi Pham
*Assistant Examiner*—Ronald Abelson
(74) *Attorney, Agent, or Firm*—Beyer Weaver & Thomas LLP

(57) ABSTRACT

A method of using DOCSIS 1.1 features to allow the addition of ISPs and QOS levels to a single cable modem without having to modify the CMTS is described in the various figures. Instead of using the SID of a data packet to determine the VPN tag of a data packet (DOCSIS 1.0), a service flow is used to identify the appropriate tag. This is done using the DOCSIS 1.1 configuration file. By doing so, the need for creating additional sub-interfaces in the cable modem interface does not arise. Instead, the configuration is modified at the provisioning server, i.e., the DHCP/TFTP server.

15 Claims, 3 Drawing Sheets

METHOD AND APPARATUS FOR MAPPING AN MPLS TAG TO A DATA PACKET IN A HEADEND

BACKGROUND OF THE INVENTION

1. Field of the Invention

The present invention relates generally to cable modem networks and provisioning cable modems. More specifically, it relates to enabling a cable modem to have multiple qualities of service or ISPs without altering any configuration data at the cable modem network headend.

2. Discussion of Related Art

As cable modems proliferate, situations will arise in which a single cable modem must accommodate various ISPs or various levels of quality of service (QOS) from a single ISP. A household may have one cable modem connected to one or more PCs or other IP-addressable devices. Members in the household will have various needs in terms of QOS, speed and other factors. For example, one member of the house may need a high QOS because he is telecommuting and his employer is paying for the comparatively high-priced service. A child in the house may not need fast or the highest-QOS Internet access but rather only modest Internet access. Yet other members of the household can get along with mid-tier QOS Internet access (but will eventually want to upgrade to a better service). The telecommuter may be required to use ISP "A" because his employer requires it if they are going to pay for it and the other members of the household may use ISP "B" which is the commonly used ISP in their geographic area. Alternatively, all members of the household can use one ISP (such as ISP "A") and have different QOSs or the household can have three different ISPs. In any case, a single cable modem has to enable multiple QOSs and ISPs if necessary. It can be noted that the cable modem network is deemed an open resource and thus has an open access requirement. This allows competition among the ISPs which want to provide Internet access service for cable modem users.

Presently, in order for a cable modem to handle the above scenario, changes must be made to the cable modem network operator's provisioning system, i.e., the DHCP/TFTP server, and to the cable modem network headend, also referred to as the CMTS. The CMTS must be modified such that for each new QOS or ISP associated with a cable modem, a new virtual cable interface is created. That is, a new sub-interface under a primary cable interface needs to be created wherein, a primary cable interface is implemented with one line card in the CMTS. For example, cable modems A1 through A5 using ISP "A" which services a certain range or group of IP addresses gets its own virtual or sub cable interface. Creating and managing all of the sub-interfaces, which are likely grow, at the CMTS require more work by the network operator and are error-prone operations potentially disrupting service for many customers.

Associated with each data packet coming upstream from the cable modem to the CMTS is an MPLS (multiprotocol label switch) label or tag. As is known in the field of cable modem networks, the MPLS tag is used as an MPLS-VPN (virtual private network) tag as is common when a shared link is used to send traffic. Presently, with the DOCSIS 1.0 design, the SID of the data packet is used to determine which MPLS/VPN tag is given to the data packet. Data traffic is labeled with an MPLS/VPN tag based on external criteria or policies. The traffic is then treated differently based on the MPLS/VPN tags. For example, in the cable modem network scenario, a data packet is sent upstream to the CMTS and then typically forwarded to another network, such as the Internet, via an edge router, for example. In the example above, each ISP can be assigned a unique MPLS-VPN tag that identifies traffic belong to that ISP. The MPLS-VPN tag can then be used as a basis to apply security/QoS or any other defined policies on the traffic.

Therefore, it would be desirable to enable a cable modem network to accommodate the addition of ISPs or QOS levels to a single cable modem by only having to update the provisioning system and without having to modify the CMTS. It would also be desirable to have a more efficient way to map a data packet to a MPLS/VPN tag in the CMTS. In the process, IP address management would be simplified by not having to create multiple sub-interfaces in the CMTS.

SUMMARY OF THE INVENTION

In one aspect of the present invention, a method of provisioning a cable modem in a cable modem network having a provisioning system and a headend is described. A configuration file is transferred to a cable modem from a provisioning system. At the headend or CMTS, a first data packet is received from a cable modem. This first data packet has associated with it a first service flow. In addition, the first data packet is mapped to a first sub-interface. A second data packet from the same cable modem is also received at the headend. The second data packet has a second service flow and is mapped to a second sub-interface. The first service flow and the second service flow are then derived at the headend. The first data packet is then tagged with a first MPLS tag and the second data packet is tagged with a second MPLS tag. During the entire process the headend is unmodified.

In one embodiment the configuration file is examined at the headend using a SID to determine service flow. In another embodiment, the configuration file contains multiple MPLS tags associated with multiple service flows. In yet another embodiment, vendor-specific information and MPLS data is downloaded to a configuration file before transmitting the configuration file to the cable modem. In yet another embodiment, the configuration file is modified at the provisioning system.

In another aspect of the present invention, a method of mapping an MPLS tag to a data packet in a CMTS is described. At the CMTS in a cable plant, a data packet having a SID is received. The SID is used to obtain a service flow assigned to the data packet. An appropriate MPLS tag is then determined for the data packet based on the service flow. The data packet is then tagged with the MPLS tag before it is transmitted to an external entity.

In another aspect of the present invention, a method of enabling a cable modem to service multiple quality of service levels for a data packet transmitted from one or more connected IP-addressable devices is described. A configuration file is received at the headend upon powering up of a cable modem, the configuration file containing one or more MPLS tags, an MPLS tag being associated with a service flow. A data packet is received from a connected IP-addressable device and has an IP address. The IP address of the data packet is examined and a classifier is determined based on the IP address by examining the configuration file.

BRIEF DESCRIPTION OF THE DRAWINGS

The invention will be better understood by reference to the following description taken in conjunction with the accompanying drawings in which.

DETAILED DESCRIPTION

Figure 1:
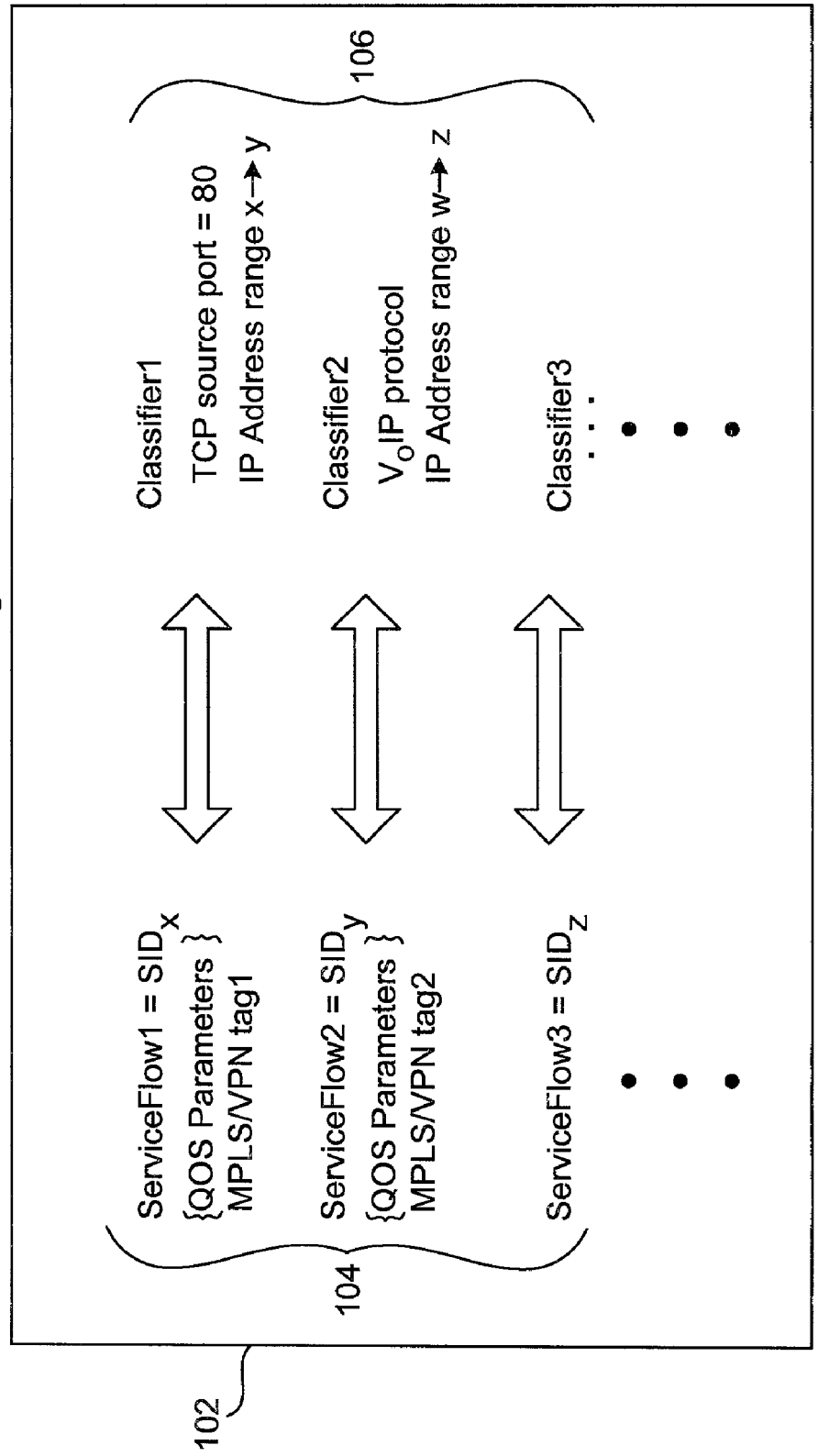
FIG. 1 is a diagram illustrating a portion of the data contained in a cable modem configuration file in accordance with one embodiment of the present invention.

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

A method of using DOCSIS 1.1 features and an enhanced version of the DOCSIS 1.0 to allow the addition of ISPs and QOS levels to a single cable modem without having to modify the CMTS is described in the various figures. Instead of using the SID of a data packet to determine the VPN tag of a data packet (DOCSIS 1.0), a service flow is used to identify the appropriate tag. As will be described below, this is done using the DOCSIS 1.1 configuration file. By doing so, the need for creating additional sub-interfaces in the cable modem interface does not arise. Instead, the configuration is modified at the provisioning server, i.e., the DHCP/TFTP server.

With DOCSIS 1.1 a single cable modem can have various service flows, where the service flows can be used to implement various QOS levels. Examples of QOS parameters include priorities, peak data rates and guaranteed data rates. Each service flow has a one or more specific defining packet classifiers. A classifier is defined by the network operator or administrator. It includes filtering data based on Layer 3 and Layer 4 header data. Data packets coming from one cable modem can have different service flows and classifiers. However, with DOCSIS 1.0, data packets with different service flows go to the same sub-interface and therefore are assigned the same MPLS/VPN tag. Therefore, in DOCSIS 1.0, there is no means of distinguishing between different types of traffic, hence all traffic is mapped to the same sub-interface. This is true because all the data packets from the same cable modem have the same IP address and therefore are assigned the same tag. With the present invention, data packets having different service flows can be assigned different MPLS/VPN tags.

A number of steps occur in order for a data packet to be tagged by the appropriate MPLS/VPN tag. There is a specific configuration of the tag and a mapping of a data packet with the tag. This was previously done using the SID of the data packet. With the present invention the mapping is done using a service flow. Policies are then determined based on the MPLS/VPN tags. As is known in the field of cable modem network management, a SID for a cable modem is established in the CMTS. The CMTS knows which subinterface the data packet belongs to. This is possible because each cable modem has an IP address and using this address, it can be determined which ISP the modem is using and, therefore, which subinterface will receive and process the data packet. At this stage the MPLS/VPN tag is added to the packet, i.e., tag processing. The MPLS tag is then examined and the appropriate policies are applied to the data packet as is normally done.

Under DOCSIS 1.1 a cable modem configuration file contains various types of information. FIG. 1 is a diagram illustrating a portion of the data contained in a cable modem configuration file in accordance with one embodiment of the present invention. A cable modem configuration file 102 is sent from the provisioning system to the cable modem when the modem is first powered on. The configuration file is essentially created by the network operator/administrator. During the modem's initial provisioning stage, the same configuration file containing additional data added by the cable modem is sent to the CMTS.

File 102 contains a listing of multiple service flows 104 naming ServiceFlow 1, ServiceFlow 2, ServiceFlow 3 and so on. A service flow maps to a particular SID. For example, ServiceFlow 1 maps to SIDx, ServiceFlow 2 maps to SIDy, and so on. Each service flow also has associated with it one or more QOS parameters. Other data similar to a QOS parameter in the configuration file includes vendor-specific extension data and the MPLS/VPN tags, determined by the network operator. Each service flow (and, by association, SID) maps to one or more classifiers. A list of classifiers 106 corresponds to service flow list 104. In FIG. 1 ServiceFlow 1 maps to Classifier 1, ServiceFlow 2 maps to Classifier 2 and so on. However, more than one classifier can map to a service flow. Each classifier identifies a particular type of data traffic based on Layer 3 and 4 header data, which can be associated with a particular quality of service in the described embodiment. For example, Classifier 1 is for regular web traffic. Data on this service flow qualifies for classifier 1 if the data goes through TCP source port 80. Classifier 2 is for data using the voice-over-IP protocol, which has a different service flow and SID, namely ServiceFlow 2 and SIDy. Thus, with DOCSIS 1.1, a configuration file for a cable modem can contain numerous service flows and SIDs. Each service flow maps to a classifier which identifies a particular quality of service. Each classifier also has an associated IP address range. This is the address range of the ISP providing service to one of the IP-addressable devices connected to the cable modem. Each ISP providing service through the cable modem has a range of IP addresses that it services. The concept of service flows mapping to classifiers for a single cable modem is a new feature in DOCSIS 1.1.

A cable modem is typically connected to one or more PCs or other IP-addressable devices. The present invention relates to sending data traffic upstream from the cable modem to the CMTS. The CMTS then sends the data to an appropriate device, such as an edge router which sends the data to the Internet. At each "stop" along the way to the packet's final destination, the MPLS/VPN tag of the data packet is checked to see what type of transmission treatment the packet should receive when the packet transits through various devices, such as routers and servers, before reaching its final destination.

Figure 2A:
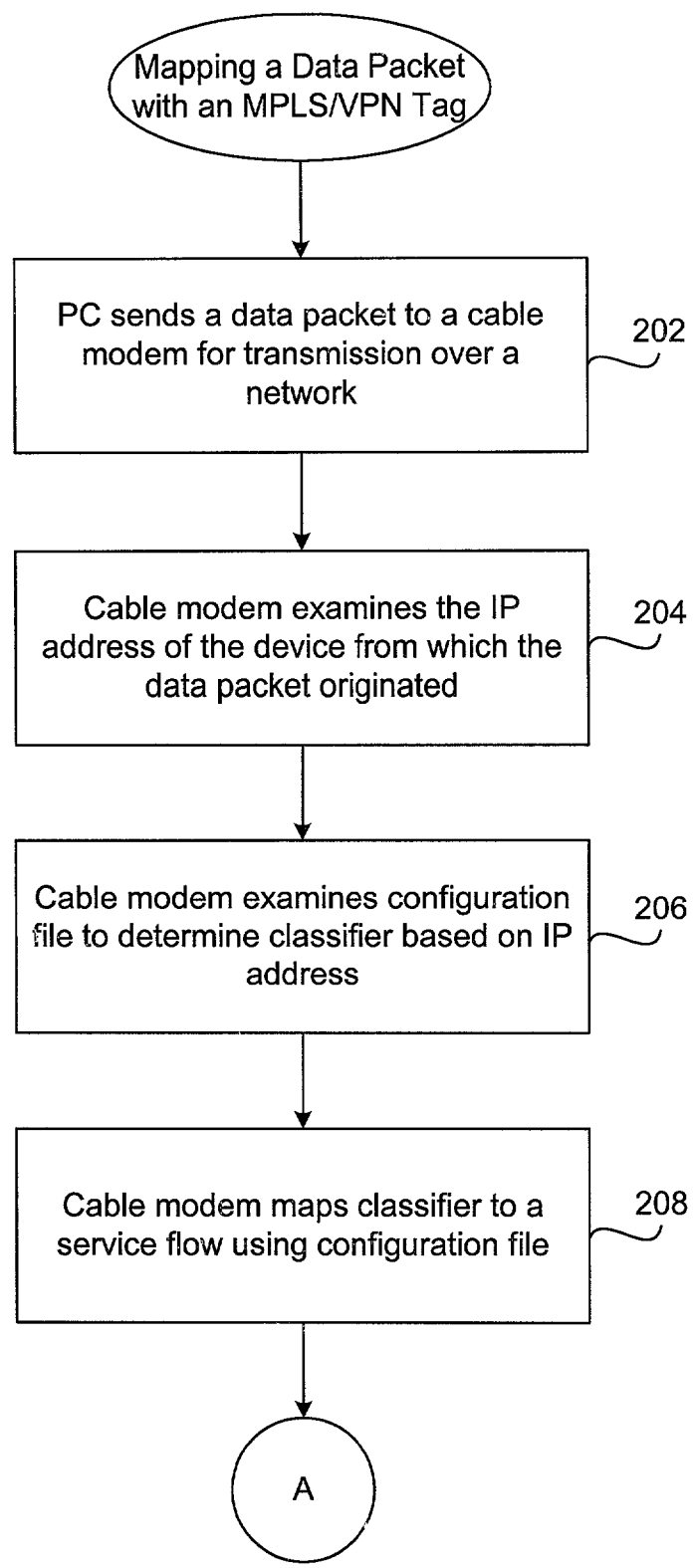
FIG. 2 is a flow diagram of a process of mapping data packets to MPLS/VPN tags in accordance with one embodiment of the present invention.
Figure 2B:
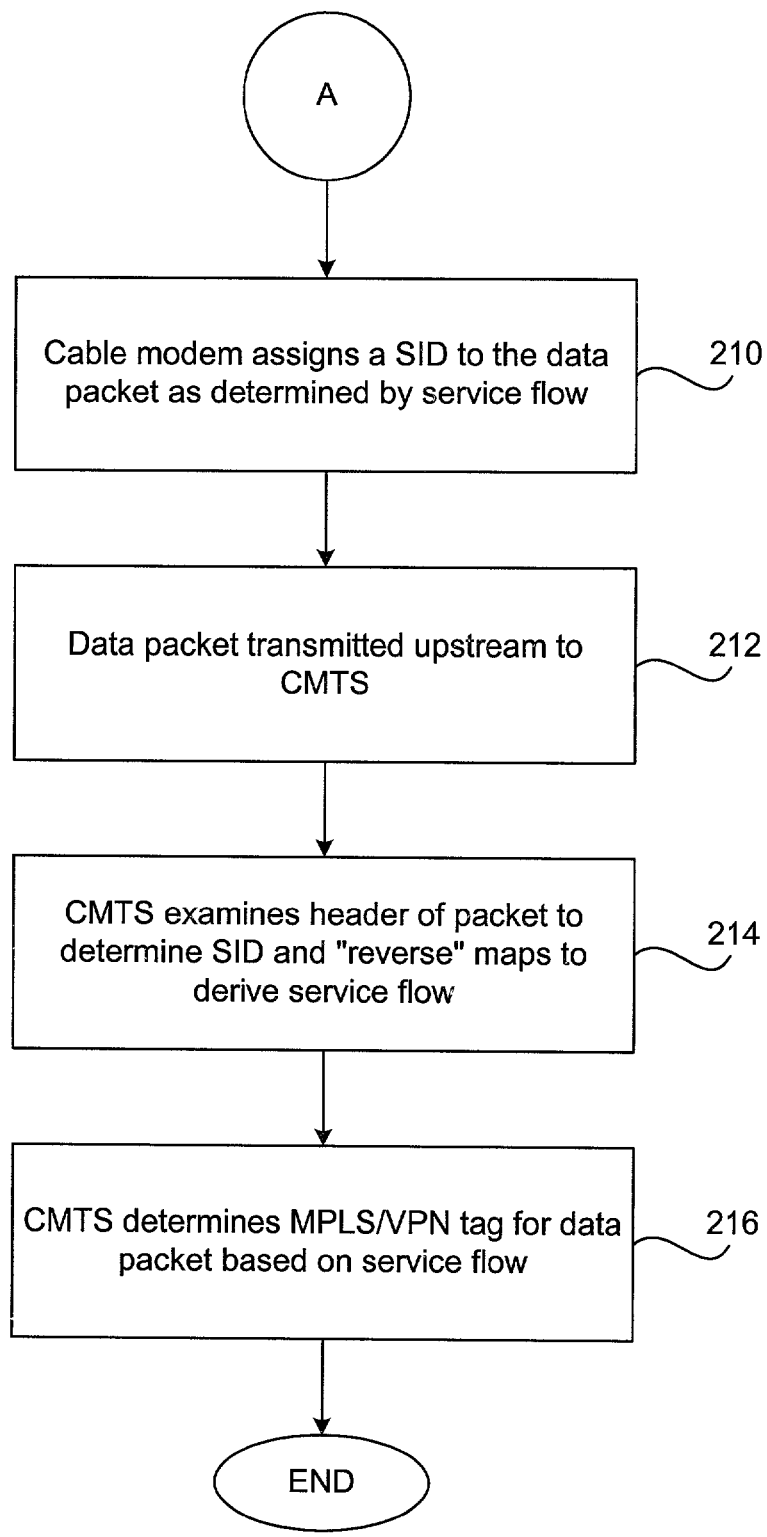

FIG. 2 is a flow diagram of a process of mapping data packets to MPLS/VPN tags in accordance with one embodiment of the present invention. At step 202 a PC or Internet appliance sends data traffic, made up of multiple data packets, to a cable modem for transmission to the Internet. For the purposes of illustrating the described embodiment, operations on a single data packet going through the process are examined. A data packet having an IP address and belonging to a particular class is sent to the cable modem. At step 204 the cable modem examines the IP address of the device from which the data packet is originating. Recall that the cable modem can be connected to numerous devices, each having a different ISP and, thus, a different IP address range. The cable modem then examines its configuration file, such as file 102, and determines which classifier the data packet belongs at step 206. Each classifier in list 106 has an IP address range. The classifier of the data packet is determined by examining within which range the IP address falls.

Once the data packet's classifier is determined using the right-hand column as shown in configuration file 102, the cable modem is able to map this information to a service flow step 208. For example, if the data packet is in classifier 2, it is mapped to ServiceFlow 2. Once the service flow is determined, a SID can be assigned to the data packet using data in the left-hand column in configuration file 102 at step 210. Each service flow has its own unique SID as shown in FIG. 1.

At this stage the data packet is transmitted upstream from the cable modem to the CMTS or headend of the cable plant at step 212. When the CMTS receives the data packet, it examines the header of the packet and reads the assigned SID. By using a configuration file similar to configuration file 102 (with additional data added by the cable modem), the CMTS uses the SID to map the data packet to a particular service flow, essentially performing the reverse of the mapping function that was performed in the cable modem at step 214. An MPLS/VPN tag is then determined based on the service flow at step 216. The configuration file contains MPLS/VPN tags for each service flow. In the process of the present invention, the vendor-specification information and MPLS tag is downloaded to the configuration file by the network operator in the provisioning system before the configuration file is sent to the cable modem, which in turn sends it to the CMTS. The present invention adds the MPLS/VPN tag as an extra "knob" in the configuration file. Thus, the present invention describes a more flexible way to map data packets with their appropriate MPLS/VPN tags. More specifically, it does so without having to create sub-interfaces in the cable interface in the CMTS and by only having to modify the provisioning system.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of provisioning a cable modem in a cable modem network having a provisioning system and a headend, the method comprising:
   transmitting a configuration file to a cable modem;
   receiving, at a headend, a first data packet from a first cable modem, the first data packet having a first service flow, the first data packet being mapped to a first sub-interface;
   receiving, at a headend, a second data packet from the first cable modem, the second data packet having a second service flow, the second data packet being mapped to a second sub-interface;
   deriving the first service flow and the second service flow at the headend; and
   tagging the first data packet with a first MPLS tag and tagging the second data packet with a second MPLS tag.

2. A method as recited in claim 1 further comprising examining a configuration file at the headend using a SID to determine a service flow.

3. A method as recited in claim 2 wherein the configuration file contains a plurality of MPLS tags associated with a plurality of service flows.

4. A method as recited in claim 1 further comprising downloading vendor-specific information and MPLS data to a configuration file before transmitting the configuration file to the cable modem.

5. A method as recited in claim 1 further comprising modifying the configuration file at the provisioning system.

6. The method as recited in claim 1, wherein the headend is unmodified.

7. The method as recited in claim 1, wherein the first service flow is associated with the first MPLS tag and the second service flow is associated with the second MPLS tag.

8. A method of enabling a cable modem to service multiple quality of service levels for a data packet transmitted from one or more connected IP-addressable devices, the method comprising:
   receiving a configuration file upon powering up the cable modem, the configuration file containing one or more MPLS tags, an MPLS tag being associated with a service flow;
   receiving a data packet from a connected IP-addressable device, the data packet having an IP address;
   examining the IP address of the data packet; and
   determining a classifier based on the IP address by examining the configuration file.

9. A cable modem comprising stored program instructions for performing the method of claim 8.

10. The method as recited in claim 8, wherein the classifier identifies a Quality of Service.

11. The method as recited in claim 8, wherein each classifier has an associated IP address range.

12. The method as recited in claim 8, wherein each service flow maps to a classifier that identifies a Quality of Service.

13. A system for provisioning a cable modem in a cable modem network having a provisioning system and a headend, the system comprising:
   means for transmitting a configuration file to a cable modem;
   means for receiving, at a headend, a first data packet from a first cable modem, the first data packet having a first service flow, the first data packet being mapped to a first sub-interface;
   means for receiving, at a headend, a second data packet from the first cable modem, the second data packet having a second service flow, the second data packet being mapped to a second sub-interface;
   means for deriving the first service flow and the second service flow at the headend; and
   means for tagging the first data packet with a first MPLS tag and tagging the second data packet with a second MPLS tag.

14. The system as recited in claim 13, wherein the headend is unmodified.

15. A system for enabling a cable modem to service multiple quality of service levels for a data packet transmitted from one or more connected IP-addressable devices, the system comprising:
   means for receiving a configuration file upon powering up the cable modem, the configuration file containing one or more MPLS tags, an MPLS tag being associated with a service flow;
   means for receiving a data packet from a connected IP-addressable device, the data packet having an IP address;
   means for examining the IP address of the data packet; and
   means for determining a classifier based on the IP address by examining the configuration file.

* * * * *